US 12,432,207 B2

United States Patent
Dhunay

(10) Patent No.: US 12,432,207 B2
(45) Date of Patent: Sep. 30, 2025

(54) SYSTEMS AND METHODS FOR PASSWORDLESS CREDENTIAL VERIFICATION

(71) Applicant: TERRAHUB TECHNOLOGIES INC., Calgary (CA)

(72) Inventor: Nav Dhunay, Calgary (CA)

(73) Assignee: TERRAHUB TECHNOLOGIES INC., Calgary (CA)

( * ) Notice: Subject to any disclaimer, the term of this patent is extended or adjusted under 35 U.S.C. 154(b) by 287 days.

(21) Appl. No.: 18/216,092

(22) Filed: Jun. 29, 2023

(65) Prior Publication Data

US 2025/0007911 A1    Jan. 2, 2025

(51) Int. Cl.
 *H04L 9/40* (2022.01)

(52) U.S. Cl.
 CPC .............................. *H04L 63/0884* (2013.01)

(58) Field of Classification Search
 CPC .................................................. H04L 63/0884
 See application file for complete search history.

(56) References Cited

U.S. PATENT DOCUMENTS

| | | | |
|---|---|---|---|
| 9,213,853 | B2 | 12/2015 | Leoutsarakos |
| 10,462,142 | B2 | 10/2019 | Pattar et al. |
| 10,735,196 | B2 | 8/2020 | Shastri et al. |
| 2020/0327219 | A1 | 10/2020 | Bolimovsky |
| 2020/0374284 | A1 | 11/2020 | Suresh et al. |
| 2020/0403993 | A1* | 12/2020 | Alexander .............. H04L 9/321 |
| 2021/0037004 | A1 | 2/2021 | Gordon et al. |
| 2022/0109674 | A1 | 4/2022 | Avetisov et al. |
| 2022/0150237 | A1 | 5/2022 | Canfield et al. |

(Continued)

FOREIGN PATENT DOCUMENTS

WO    2022214773 A1    10/2022

OTHER PUBLICATIONS

"A web tool for analyzing FIDO2/WebAuthn Requests and Responses", Association for Computing Machinery, ARES 2021, Aug. 17, 2021, https://doi.org/10.1145/3465481.3469209.

(Continued)

*Primary Examiner* — Huan V Doan
(74) *Attorney, Agent, or Firm* — Greenberg Traurig, LLP

(57) ABSTRACT

Systems and methods for passwordless credential verification. A client system includes: a processor and a memory. The memory stores processor-executable instructions that configure the processor to: receive, from a service provider system, an encoded credential verification query, the query identifying at least one digital credential for verification; determine, based on a set of user digital credentials stored at a digital credential store, at least one digital credential issued by an issuer device separate from the service provider system satisfactory for responding to the encoded credential verification query; generate, for display, a user interface enumerating one or more determined digital credentials satisfactory for responding to the query; receive, via the user interface, a selection of the one or more digital credentials for generating a response to the query; and transmit, to the service provider system, a response signal representing the selected one or more digital credentials for responding to the query.

20 Claims, 10 Drawing Sheets

(56) References Cited

U.S. PATENT DOCUMENTS

2022/0303268 A1* 9/2022 Karnaros .............. G06F 21/36
2022/0353256 A1 11/2022 Cizer Kobrinsky et al.

OTHER PUBLICATIONS

"FIDO2 the Rescue? Platform vs. Roaming Authentication on Smartphones", In Proceedings of the 2023 CHI Conference on Human Factors in Computing Systems, Apr. 18, 2023, https://doi.org/10.1145/3544548.3580993.

* cited by examiner

SYSTEMS AND METHODS FOR PASSWORDLESS CREDENTIAL VERIFICATION

FIELD

Embodiments of the present disclosure generally relate to the field of digital credential verification and, in particular, to systems and methods for passwordless credential verification.

BACKGROUND

Computing systems may be configured with access control operations. In some examples, a client device may be granted access to a computing system upon transmitting, via a login user interface screen, a combination of a username and password.

In some scenarios, access control operations may include passwordless credential verification operations. For example, a client device may be granted access to a computing system upon transmitting a passkey in the form of a biometric input (e.g., user fingerprint or facial scan) or a user interface swipe pattern, among other examples.

In some examples, access control operations may include out-of-band authentication operations. For instance, a client device may receive a one-time password via a short message service (SMS) message for transmitting to a computing system prior to being granted access to the computing system.

SUMMARY

The present disclosure describes embodiments of systems and methods for passwordless credential verification. In some embodiments, systems may be configured to conduct passwordless credential verification prior to granting access to service provider resources, such as an online website portal, among other example resources.

Embodiments of service provider systems described herein may be configured to conduct passwordless credential verification based on one or a plurality of digital credentials issued by issuer devices separate from the service provider systems. For example, a medical clinic online portal may be configured to verify an identity of a client device user based on a digital credential issued by another organization, such as a government organization, among other example types of organizations. Accordingly, a client device user may be granted access to service provider resources without having previously established a profile or credential with the service provider system. Such client devices may leverage pre-established digital credentials for accessing resources at service provider systems.

In some embodiments of systems described herein, a client device may be configured to enumerate a curated subset of attributes associated with digital credentials that may be satisfactory for responding to a digital credential verification challenge query. In some embodiments, only those digital credentials satisfactory for responding to a credential verification challenge query would be made available for generating a response to the credential verification challenge. Accordingly, digital credentials or portions of digital credentials unsuitable for responding to a credential verification challenge query may not be unnecessarily revealed to service provider systems or other computing devices of passwordless credential verification systems.

Features of embodiments of systems and methods will be further disclosed herein.

In one aspect, the present disclosure provides a client system for passwordless credential verification. The client system may include: a processor; a memory coupled to the processor and storing processor-executable instructions. The processor-executable instructions, when executed, may configure the processor to: receive, from a service provider system, an encoded credential verification query, the encoded credential verification query identifying at least one digital credential for verification; determine, based on a set of user digital credentials stored at a digital credential store, at least one digital credential issued by an issuer device separate from the service provider system satisfactory for responding to the encoded credential verification query; generate, for display, a user interface enumerating one or more determined digital credentials satisfactory for responding to the encoded credential verification query, the one or more enumerated digital credentials being a subset of the set of user digital credentials stored at the digital credential store; receive, via the user interface, a selection of the one or more digital credentials for generating a response to the encoded credential verification query; and transmit, to the service provider system, a response signal representing the selected one or more digital credentials for responding to the encoded credential verification query.

In another aspect, the present disclosure provides a method for passwordless credential verification. The method may include: receiving, from a service provider system, an encoded credential verification query, the encoded credential verification query identifying at least one digital credential for verification; determining, based on a set of user digital credentials stored at a digital credential store, at least one digital credential issued by an issuer device separate from the service provider system satisfactory for responding to the encoded credential verification query; generating, for display, a user interface enumerating one or more determined digital credentials satisfactory for responding to the encoded credential verification query, the one or more enumerated digital credentials being a subset of the set of user digital credentials stored at the digital credential store; receiving, via the user interface, a selection of the one or more digital credentials for generating a response to the encoded credential verification query; and transmitting, to the service provider system, a response signal representing the selected one or more digital credentials for responding to the encoded credential verification query.

In another aspect, a non-transitory computer-readable medium or media having stored thereon machine interpretable instructions which, when executed by a processor may cause the processor to perform one or more methods described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
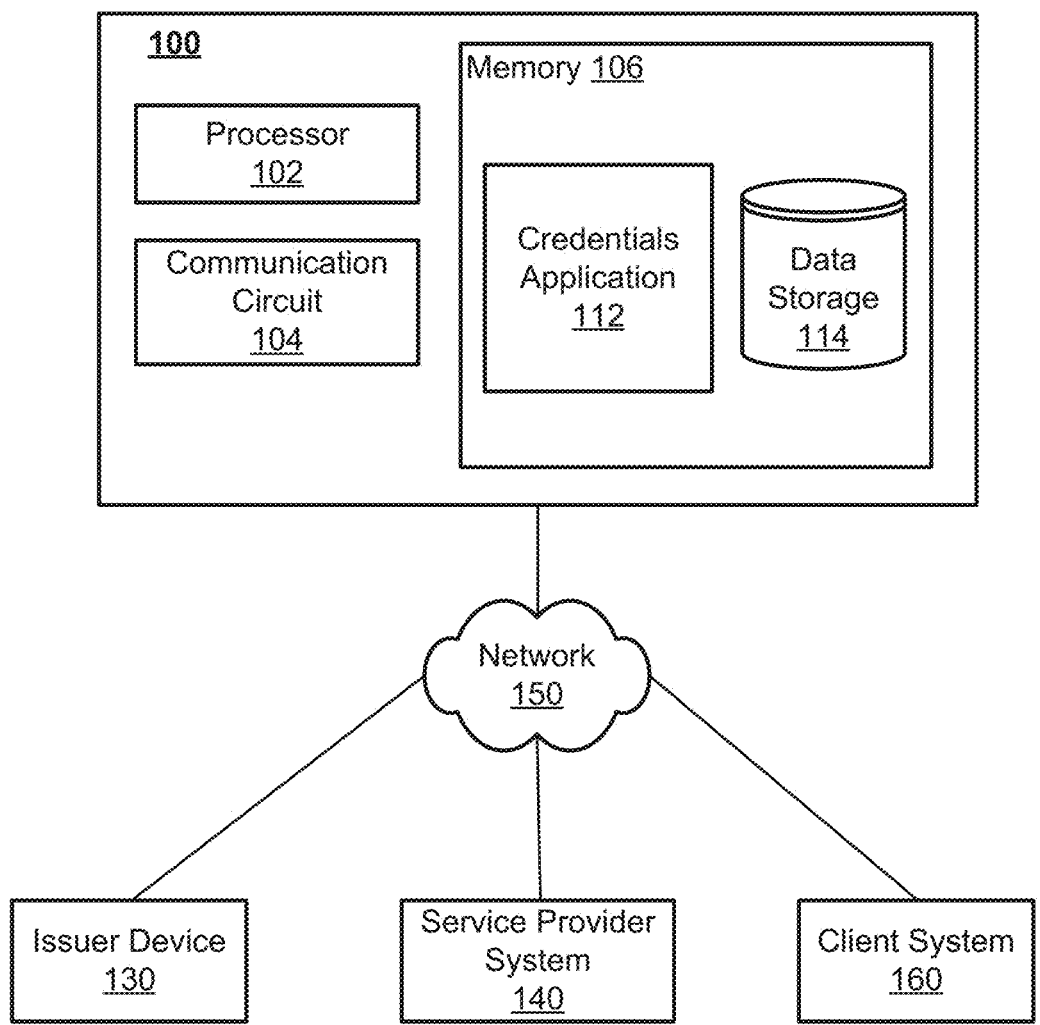
FIG. 1 illustrates a credentials system, in accordance with an embodiment of the present disclosure.

Embodiments of systems and methods for passwordless credential verification are described in the present disclosure.

In some embodiments, client or mobile devices may be configured to store and execute a wallet application. A wallet application may be configured to store digital credentials issued to a client device user. In some scenarios, digital credentials may be a digital or electronic equivalent of a paper-based credential, such as a passport, a driver's license, a certificate, or other document representing characteristics of a client device user. Digital credentials may represent a user's personal identity details, attestation of qualifications or competence, historical background, among other examples. Respective digital credentials may include one or a plurality of discrete data or attributes representing a user's personal identity details, attestation of qualifications or competence, or historical background, among other data.

For example, a digital credential may represent a user's driver's license, and discrete data or attributes may include the user's full legal name, the user's birth date, the user's most recent driving test date, whether the user requires corrective lenses, whether the user may have completed a series of vaccinations targeting an emerging virus, among other examples of discrete data or attributes.

In some scenarios, digital credentials may be issued and/or attested to by organizations or entities. Organizations or entities may be governmental entities, private organizations, or other types of organizations. In some scenarios, digital credentials issued by particular organizations may be considered to be a reliable, accurate, or trusted. For example, digital credentials issued by a government agency may be provided greater weight as an attestation of a client device user's identity (e.g., driver's license credentials, passport credentials, health card information credentials, among other examples) as compared to digital credentials issued by a retail store rewards membership card.

In another example, for validating a user's banking account assets, digital credentials issued by banking institutions may be provided greater weight as compared to a tax return portal maintained by a government entity. In another example, digital credentials associated with electronic mail (e-mail) access issued by software-as-a-service (SaaS) companies may be satisfactory for accessing electronic systems for electronic communication messaging.

In some embodiments, a digital credentials wallet application may be configured to store instances of digital credentials issued by a set of issuer entities to a particular client device user. For example, a digital credentials wallet application may be configured at a client mobile device and may provide a client user with access to one or more digital credentials issued to the client device user.

The plurality of digital credentials may respectively have been issued by various organizations or entities. Because the respective digital credentials may represent different sets of discrete data about the client user, the client user may utilize a subset of digital credentials for credential verification in some scenarios (e.g., identify verification) and may utilize a different subset of digital credentials for credential verification in other unrelated scenarios (e.g., completion of requisite milestones for attending an event).

In some scenarios, a service provider system may not require that digital credentials for verification be associated with an accreditation credential provided by a trusted or known organization or entity. In some scenarios, the service provider may not be interested in or require that a digital credential be verified/accredited by a trusted or known organization. Thus, in some embodiments, one or more digital credentials may be user-attested digital credentials. For example, a user-attested digital credential may represent a user's email address or other user attribute, and the user-attested digital credential may not be associated with an accreditation credential. The user-attested digital credential may be stored within a digital credentials wallet, and may be unverified by an issuing entity or device. Scenarios including user-attested digital credentials will be described in the present disclosure.

In some scenarios, computing systems may be configured with access control operations based on digital credentials received from client device users. For example, computing systems may be configured to provide online access to user banking accounts for conducting transactions, or provide online access to a medical services portal, among other examples. In other examples, computing systems may be configured at physical access points to buildings, and access may be granted based on digital credentials received from the client device users. In some embodiments, the digital credentials may be user-attested or may be verified digital credentials. Other access control use cases based on receipt of digital credentials may be contemplated.

In some scenarios, a client device may be granted access to a computing system upon transmitting a username/password at a login screen. However, alphanumeric passwords may be challenging to remember or keep track of, or may be compromised by unscrupulous users. Accordingly, it may be desirable to provide systems and methods of passwordless credential verification.

In some embodiments, computing systems may be configured with access control operations that include passwordless credential verification operations, such as out-of-band authentication operations. For example, a client device may receive a one-time password via a SMS message for transmitting to a computing system as a condition for being granted access to the computing system. In another example, a client device may be configured to capture an image of a quick response (QR) code associated with operations for accessing the computing system. In the above-described non-limiting examples, the client device may be granted access to a computing system based on data or information of passwordless credential operations.

In some scenarios, computing systems may be configured to grant access to online portals based on verifying an identity or other specific characteristic of a client device user. As an example, a medical clinic's portal website may be configured to allow a user to access the portal website for booking an appointment with a medical professional upon verifying the user's identity represented by a digital credential. For example, the user's identity may be verified based on a combination of the user's full legal name, birth date, and a portion of the user's address (e.g., last 3 characters of a postal code or ZIP code) as captured in a digital credential issued by an organization that the medical clinic may have previously vetted.

In another example, the medical clinic may enact a short-term policy requiring visiting patients for non-emergency conditions to provide proof of vaccination for an emerging virus within a community. The medical clinic portal may require that a user transmit digital credentials representing a record of vaccinations targeting an emerging virus within the community as a condition for booking an appointment for seeing a medical professional for a non-emergency condition.

It may be desirable to provide systems and methods for passwordless credential verification based on digital credentials issued by an issuer device that is unrelated to or separate from a service provider user. As will be illustrated in the present disclosure, service provider systems may be configured to grant access to services or resources even when client users may not have established any access credentials with the service provider systems. For example, access to a privately-run medical clinic portal may be based on digital credentials issued by a government organization unrelated to the privately-run medical clinic.

In some embodiments, the service provider system may allow access to a portal website for booking an appointment with a medical professional upon verifying the user's identity. The user's identity may be verified based on a digital credential stored in a user's digital credential wallet application. In some embodiments, the service provider system may verify the user's identity based generally on the user having a requisite digital credential (e.g., a user simply possessing a valid or current health card, or a user simply possessing a medical record showing vaccination for reducing effects of an emerging virus).

In some embodiments, service provider system may verify the user's identity based on a specific combination of data or attributes represented by one or more digital credentials issued to the user. For instance, the user's identity may be verified based on a combination of the user's full legal name, birth date, and a portion of the user's address (e.g., last 3 characters of a postal code or ZIP code), among other example combinations of user specific details. In some example scenarios, the service provider system may require compound proof of verification, where attributes may be represented by one or a combination of digital credentials. For example, the service provider system may require receipt of two digital credentials respectively representing a user's age and a residency status.

In some scenarios, a user's digital credential wallet application may include one or a plurality of discrete digital credentials that may respectively be suitable individually for verifying the user's identity. For example, a driver's license digital credential, a passport digital credential, or a third-party health insurance benefits card may respectively include the necessary data for verifying the user's identity. It may be desirable to provide systems and methods for granting a client device user access to computing systems based on any one of a plurality of digital credentials representing the requisite combination of user identity data, even though the user may not have previously established a user profile at the computing system (e.g., associated with the medical clinic).

Reference is made to FIG. 1, which illustrates a credentials system 100, in accordance with an embodiment of the present disclosure. As a non-limiting example, the credentials system 100 may be a centralized system for managing digital credentials for a plurality of users.

The credentials system 100 may transmit or receive data messages via a network 150 to or from an issuer device 130, service provider system 140, and/or a client system 160. A single issuer device 130, a single service provider system 140, and a single client system 160 are illustrated in FIG. 1; however, it may be understood that any number of issuer devices 130, service provider systems 140, or client systems 160 may be used to transmit/receive data messages to or from the credentials system 100.

In some embodiments, the issuer device 130 may be an entity issuing or attending to digital credentials. In some embodiments, the issuer device 130 may be associated with a governmental entity issuing digital credentials representing a user health cards or vaccination records, among other examples. In other examples, the issuer device 130 may be associated with a governmental entity issuing digital credentials representing identity cards, such as passports or drivers' licenses, among other examples. In other examples, the issuer device 130 may be associated with privately owned organizations issuing digital credentials representing with membership cards or user credentials, among other examples.

In some embodiments, the credentials system 100 may receive from the issuer device 130 records of digital credentials for storing within a data storage 114.

In some embodiments, the service provider system 140 may be an entity providing access to services, buildings, or electronic resources, among other examples. As an example, the service provider system 140 may be associated with a health care organization for providing medical care, and may be configured to provide an online medical portal to client device users. The online medical portal may be configured to receive medical appointment requests from client device users, to allow access to patient test results or medical charts, or to initiate virtual medical consultation sessions.

In another example, the service provider system 140 may be associated with a building management organization for providing access control to rooms or facilities within a property. Other examples of service provider systems 140 for providing resources may be contemplated.

In some embodiments, the client system 160 may be a combination of a primary client device and a secondary client device. In some examples, the primary client device may be a desktop or laptop computer and the secondary client device may be a mobile device (e.g., smartphone or tablet device) configured to interact with the primary client device for passwordless credential verification operations described in the present disclosure. As will be described in some scenarios herein, the primary client device may display graphical indicia (e.g., QR codes) or other unique hyperlink or universal resource locator representing a challenge query, and the secondary client device may interact with the primary client device for identifying one or more digital credentials for responding to a challenge query.

In an example, the displayed graphical indicia may include an encoded request for discrete user data, and the secondary client device may be configured to capture an image of the graphical indicia encoding the request. The secondary client device may be configured to conduct operations for determining one or more digital credentials associated with a user that are suitable for addressing the challenge query. Examples will be described in the present disclosure.

In some embodiments, the secondary client device may be a smartphone device. The smartphone device may include an image capture device for generating image data representing a graphical indicia displayed by the primary client device. The client system 160 may be associated with a client user and may enable the client user to conduct passwordless credential verification for accessing resources provided by the service provider system 140.

The credentials system 100 includes a processor 102 configured to implement processor-readable instructions that, when executed, configure the processor 102 to conduct operations described herein.

In some examples, the processor 102 may be a microprocessor or microcontroller, a digital signal processing processor, an integrated circuit, a field programmable gate array, a reconfigurable processor, or combinations thereof. In some embodiments, the processor 102 may be a combination of a central processing unit and an application specific integrated circuit (e.g., a graphics processing unit).

The credentials system 100 includes a communication circuit 104 configured to transmit or receive data messages to or from other computing devices, to access or connect to network resources, or to perform other computing applications by connecting to a network (or multiple networks) capable of carrying data.

The network 150 may include a wired or wireless wide area network (WAN), local area network (LAN), a combination thereof, or other networks for carrying telecommunication signals. In some embodiments, network communications may be based on HTTP post requests or TCP connections. Other network communication operations or protocols may be contemplated.

In some embodiments, the network 150 may include the Internet, Ethernet, plain old telephone service line, public switch telephone network, integrated services digital network, digital subscriber line, coaxial cable, fiber optics, satellite, mobile, wireless, SS7 signaling network, fixed line, local area network, wide area network, or other networks, including one or more combination of the networks. In some examples, the communication circuit 104 may include one or more busses, interconnects, wires, circuits, or other types of communication circuits. The communication circuit 104 may provide an interface for communicating data between components of a single device or circuit.

The credentials system 100 includes memory 106. The memory 106 may include one or a combination of computer memory, such as random-access memory, read-only memory, electro-optical memory, magneto-optical memory, erasable programmable read-only memory, and electrically-erasable programmable read-only memory, ferroelectric random-access memory, or the like. In some embodiments, the memory 106 may be storage media, such as hard disk drives, solid state drives, optical drives, or other types of memory.

The credentials system 100 may include a credentials application 112 including operations for receiving, storing, or transferring digital credentials to other computing devices. In some embodiments, the credentials application 112 may include operations for determining or compiling a subset of digital credentials suitable for addressing a passwordless credential verification challenge query for providing access to resources. The credentials application 112 may include processor-readable instructions for conducting operations described herein.

The system 100 includes data storage 114. In some embodiments, the data storage 114 may be a secure data store. In some embodiments, the data storage 114 may store image data representing digital credentials respectively associated with client users. In some embodiments, the data storage 114 may store other data sets associated with determining whether or which digital credentials stored in the data store 114 may be satisfactory for responding to passwordless credential verification queries.

As will be described in some embodiments of the present disclosure, the client systems 160 may be configured to conduct some operations that may be otherwise be conducted by the credentials system 100. For example, the client systems 160 may be configured to include operations for determining or compiling a subset of digital credentials suitable for addressing a passwordless credential verification challenge query.

The respective issuer device 130, the service provider system 140, or the client system 160 may be a computing device, such as a desktop or laptop computer, server computer, mobile smartphone device, a tablet device, or a thin-client computing device.

Respective issuer devices 130, service provider systems 140, or client systems 160 may include a processor, a memory, or a communication interface, similar to the example processor, memory, or communication interfaces of the credentials system 100. In some embodiments, the issuer devices 130, service provider systems 140, or client systems 160 may be a computing devices associated with a local area network. The respective computing devices may be connected to the local area network and may transmit one or more data sets to the credentials system 100.

As described herein, a wallet application may be configured to store digital credentials issued to a client device user. In some embodiments, a secondary client device (e.g., mobile device) of the client system 160 (FIG. 1) may include memory configured to store a wallet application. The wallet application may include operations for storing digital credentials issued to a client user.

Figure 2:
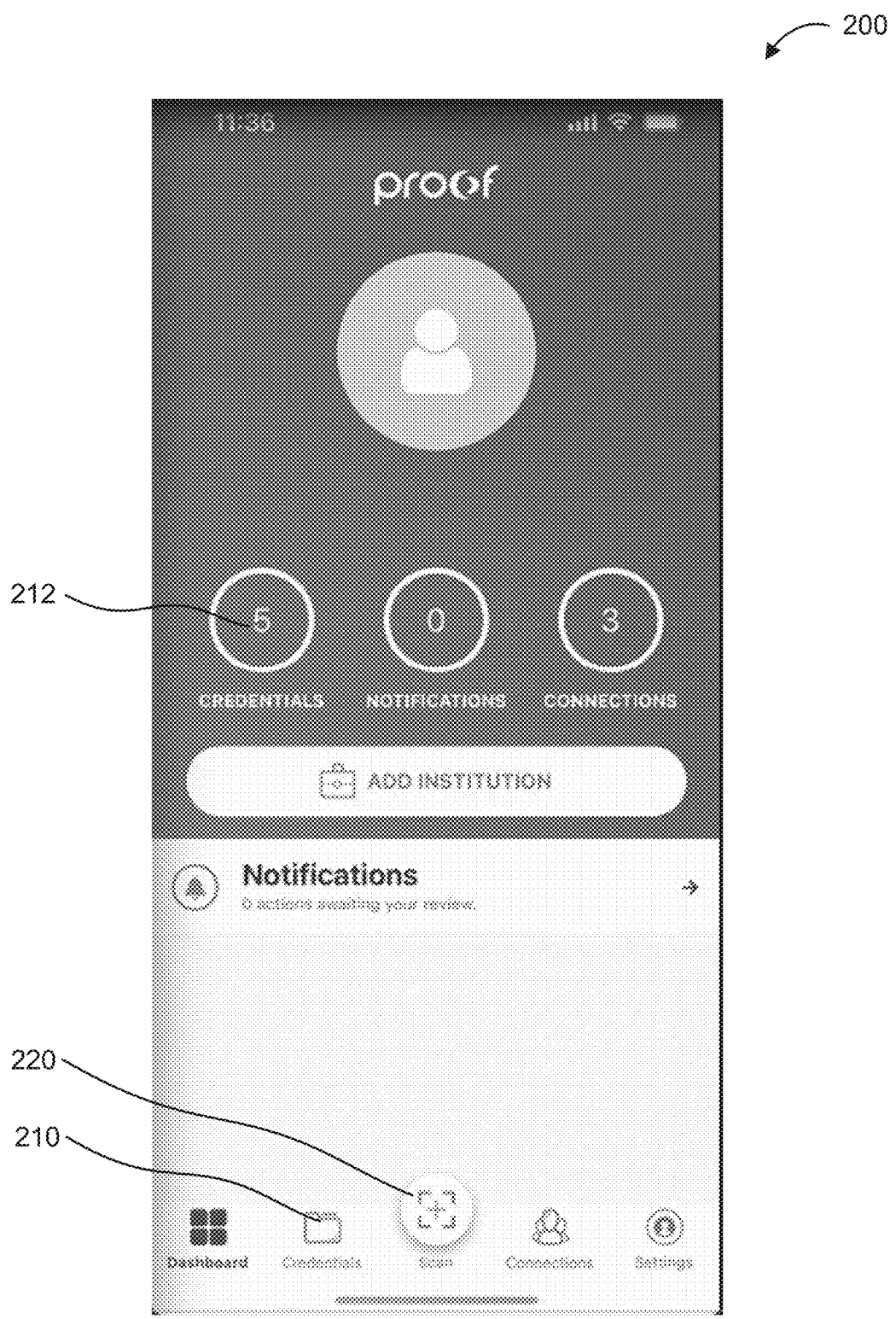
FIG. 2 illustrates a user interface of a wallet application, in accordance with embodiments of the present disclosure.

Reference is made to FIG. 2, which illustrates a user interface 200 of a wallet application, in accordance with embodiments of the present disclosure. The user interface 200 may include a credentials interface element 210 configured to allow a user to navigate to a user interface for managing one or a plurality of digital credentials associated with the client device user.

The user interface 200 may include a credentials status interface element 212 representing a quantity or status of stored digital credentials associated with the client device user.

In some embodiments, the user interface 200 may include an image scan element 220 configured to allow the user to navigate to a user interface for capturing, based on augmented reality, image data associated with indicia representing a credentials challenge query (to be described in the following description).

In some embodiments, the user interface 200 may include other user interface elements configured to allow the user to navigate to wallet notifications, user connections, or other feature interfaces of the wallet application.

Upon a user activating the credentials interface element 210, the wallet application may be configured to transition to a credentials management interface.

Figure 3:
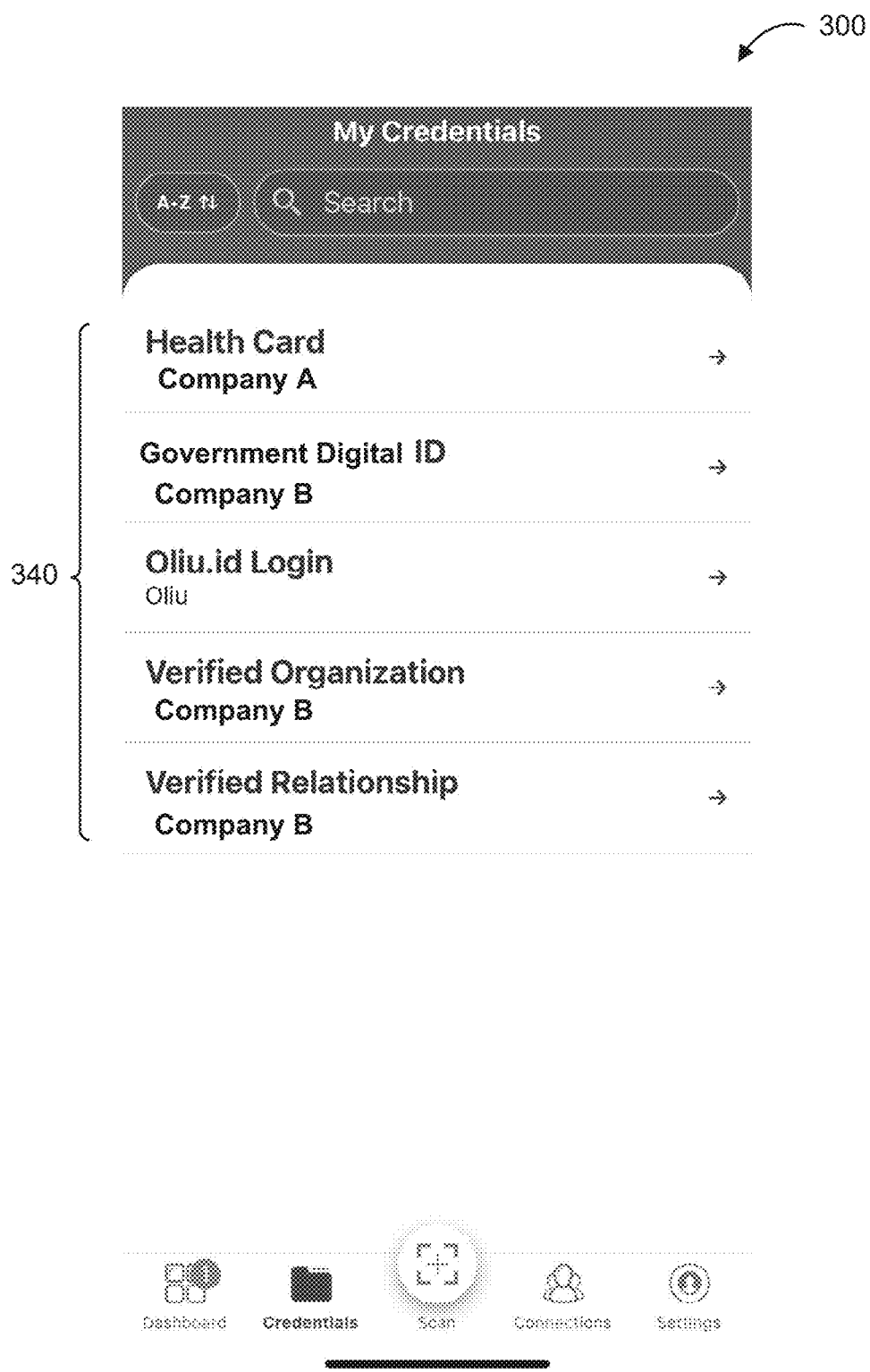
FIG. 3 illustrates a credentials management interface of a wallet application, in accordance with embodiments of the present disclosure.

Reference is made to FIG. 3, which illustrates a credentials management interface 300 of a wallet application in accordance with embodiments of the present disclosure.

The credentials management interface 300 may be configured to provide a summary listing 340 of one or a plurality of digital credentials issued to the client device user. For example, once an issuer device 130 transmits a digital credential to the secondary client device of the client system 160, the wallet application may append the digital credential to the summary listing 340. In some embodiments, the secondary client device may retrieve one or more digital credentials associated with the client device user from the credentials system 100.

In the example illustrated in FIG. 3, the summary listing includes five digital credentials representing a health card issued by Company A, a "Government Digital ID" credential issued by Company B, an "Oliu.id Login" credential issued by an organization named Oliu, a "Verified Organization" credential and a "Verified Relationship" credential issued by Company B. In some embodiments, the heath card issued by Company A may be a digital or equivalent of a physical, paper-based health card of the client device user.

In some embodiments, the "Verified Organization" or "Verified Relationship" credential issued by Company B may be an attestation by the Company B organization that the client device user is associated with a particular organization or has a verified relationship with the organization.

In some embodiments, the respective digital credentials illustrated in the summary listing 340 may include one or more discrete attributes. For example, the Heath Card digital credential may include multiple attribute fields for storing the client device user name, birth date, health card number, expiry date, version code, or photo, among other examples.

In some embodiments, the various digital credentials may have varying number or types of discrete attributes based on the nature or type of digital credential.

As described, in some scenarios, it may be desirable to provide systems and methods for granting a client device user access to computing systems, or other resources, based on any one of a plurality of digital credentials representing a requisite combination of discrete attributes associated with a client device user. The requisite combination of discrete attributes may be defined or mandated by a service provider system 140 providing access to computing systems or other resources.

For ease of exposition, embodiments of the present disclosure will be described with reference to a scenario where a service provider system 140 (FIG. 1) may be configured to grant access to an online portal upon verifying an identity or other specific characteristic of a client device user.

For example, a medical clinic's portal website may be configured to allow a user to access the portal website for booking an appointment with a medical professional upon verifying the user's identity or other information. The user's identity may be verified based on a combination of discrete attributes representing the user's identity or that are unique to the particular user. The combination of discrete attributes associated with a verification challenge query may include a user last name, a health card number, a health card version code, and a portion of a user's address (e.g., last 3 characters of a postal code or ZIP code).

Figure 4:
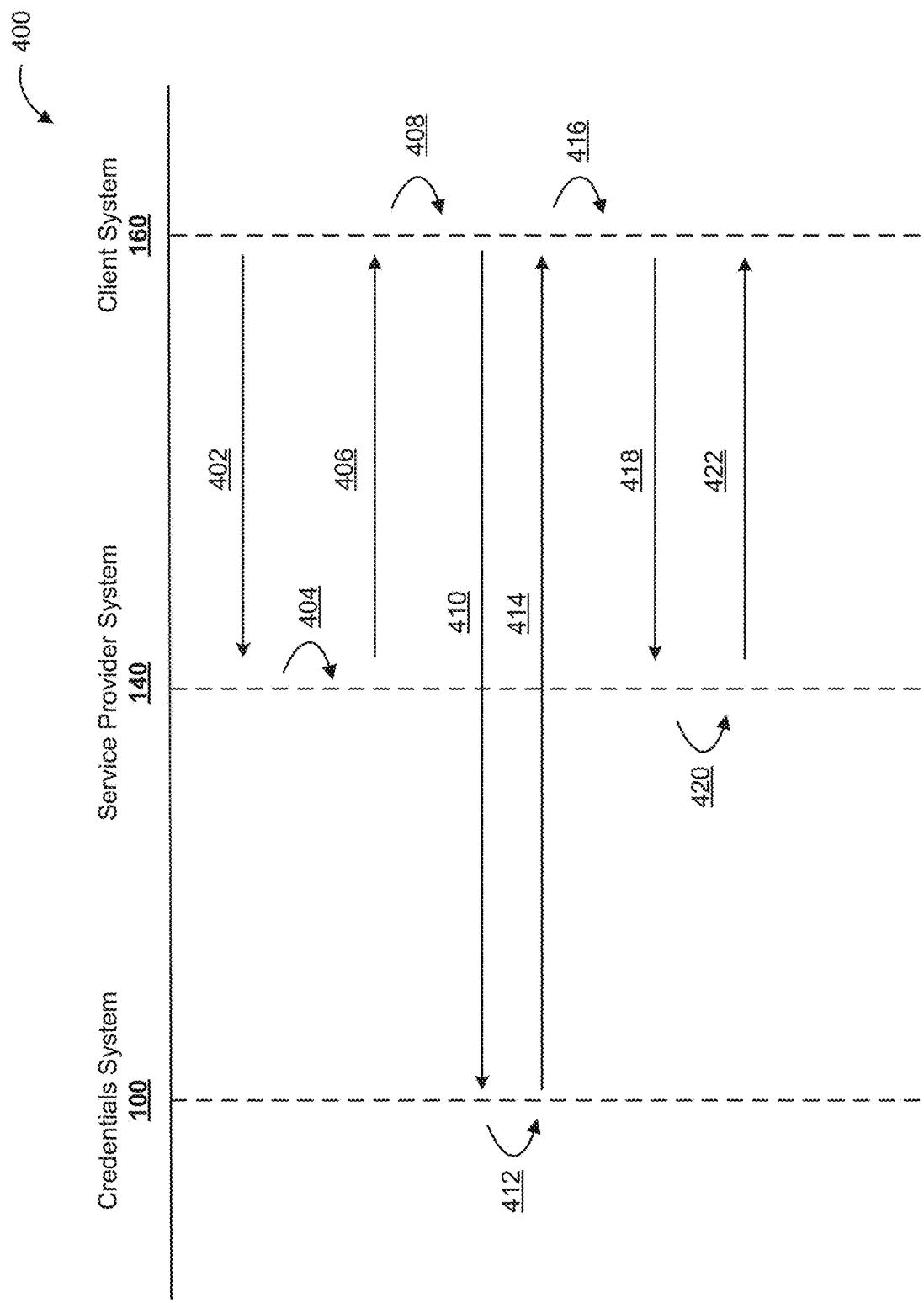
FIG. 4 illustrates a method for transmitting and receiving signals among example computing devices of a passwordless credential system, in accordance with embodiments of the present disclosure.

Reference is made to FIG. 4, which illustrates a method 400 for transmitting and receiving signals among computing devices of a passwordless credential system of FIG. 1, in accordance with embodiments of the present disclosure.

In FIG. 4, the service provider system 140 may be associated with the medical clinic. The service provider system 140 may be configured to provide a medical clinic portal website allowing client device users to access the portal website for booking an appointment with a medical professional upon verifying user identity or other specific characteristic of a client device user.

In some embodiments, the client system 160 may include a combination of a primary client device and a secondary client device. The primary client device may be a desktop or laptop computer, and the primary client device may be configured to display the portal website on a display screen. The secondary client device may be a mobile device (e.g., a smartphone or tablet device) and may be configured with a wallet application. The wallet application may store one or more digital credentials associated with the user.

In some scenarios, digital credentials may represent personally identifiable information of a client device user. In some scenarios, it may be desirable to reveal only as much personally identifiable information as required for responding to a credential verification challenge query. That is, a given digital credential may represent a set of discrete attributes; however, only a subset of the set of discrete attributes may be required for responding to the credential verification challenge query. In some embodiments, the credentials system 100 or a wallet application may identify the subset of discrete attributes of a digital credential for responding to the credential verification challenge query.

In some embodiments, the credentials system 100 or a wallet application may identify one or a subset of digital credentials for responding to the credential verification challenge query, such that particular attributes are not revealed. In such a scenario, it may be sufficient to respond to the credential verification challenge query based on having a given digital credential itself.

In some embodiments, the credentials system 100 may include the credentials application 112 (FIG. 1). The credentials application 112 including operations for retrieving digital credentials associated with a client device user, or determining whether one or more digital credentials may include discrete attributes satisfactory for a credential verification challenge query. For example, successfully identifying discrete attributes satisfactory for responding to a credential verification challenge may provide for access to resources.

The method 400 may be conducted by one or more processors at the respective computing devices. The processor-readable instructions may be stored in memory of respective computing devices. The method 400 may include operations such as data retrievals, data manipulations, data storage, or the like, and may include other computer executable functions.

At operation 402, the client system 160 may transmit, to the service provider system 140, a signal representing a request to access to a computing resource. For example, the signal may include a request to access a medical clinic portal website. As an example, the primary client device of the client system 160 may be a laptop or desktop computer from which the user may wish to book an appointment with a medical professional or access a test result from a prior conducted medical diagnostic test (e.g., bloodwork).

In some examples, the medical clinic portal website may provide a user interface for receiving a username/password input. However, alphanumeric passwords may be challenging to remember or keep track of, or may be compromised by unscrupulous users.

In another example, the medical clinic portal website may provide operations for a client user to verify identity or credentials based on a pre-configured out-of-band verification process. For example, a one-time password may be sent to a client device, and the client device may transmit the one-time password to the service provider system 140 for verifying identity of the client device user. Such credential or identity verification operations may require that client device users have a prior-registered profile at the service provider system 140 for generating the out-of-band verification process.

It may be desirable to conduct passwordless credential verification of a client device user for allowing access to resources at the service provider system 140 without reliance on pre-existing or prior-registered client device user profiles associated with the service provider system 140. As will be described in the present disclosure, embodiments of systems and methods described herein may provide passwordless credential verification to allow a client system 160 to access resources at a server provider system 140 without having previously establishing any profile or out-of-band verification mechanism.

In some embodiments, the client system 160 may include a wallet application associated with the user, and the wallet application may store one or a plurality of digital credentials associated with the user. In particular, the secondary client device (e.g., a smartphone device) may be configured to include the wallet application for storing the digital credentials associated with the user. The digital credentials may have previously been issued by an organization. The respective organization may be a government entity, private organization, or other type of organization.

In some scenarios, the wallet application may store digital credentials that may be unassociated with or agnostic to any service provider system 140. As an example, a digital credential may represent a government-issued heath card, and may be cryptographically signed by a government agency, such as a Ministry of Health. The digital credential may represent a government-issued health card and may include discrete attributes storing a full user name, a health card number and version code, user address, expiry date, among other details. In the present example of digital credential, the discrete attributes associated with respective data credentials may be trusted or deemed accurate to the extent that the issuing organization (Ministry of Health) is a trusted entity known to provide trusted data.

At operation 404, the service provider system 140 may parse the request to access the medical clinic portal website for determining the type of resource access being sought by the client system 160.

In some embodiments, the service provider system 140 may determine a combination of specific discrete attributes satisfactory for conducting passwordless credential verification of a client device user. Such a combination of specific discrete attributes may represent specific characteristics for uniquely identifying the client device user.

In some other embodiments, the service provider system 140 may determine that a user possessing a particular digital credential may be satisfactory for conducting passwordless credential verification of a client device user. In this example, it may not be necessary to determine the combination of specific discrete attributes for uniquely identifying the client device user.

In some embodiments, the service provider system 140 may generate a digital indicia, such as a quick response (QR) code, for presentation to the client system 160. The digital indicia may be encoded with a credential verification challenge query, and may define the combination of specific discrete attributes sought for passwordless credential verification for that particular client device user.

In some embodiments, the service provider system 140 may generate a unique uniform resource locator (URL) for presentation to the client system 160. The URL may be encoded with a credential verification challenge query, and may similarly define a combination of specific discrete attributes sought for passwordless credential verification for that particular client device user. In some examples, the unique URL for the passwordless credential verification may provide re-direction to a website for receiving digital credentials from the client system 160.

In some other embodiments where the service provider system 140 may determine that a user possessing a particular digital credential may be satisfactory, the generated digital indicia or unique URL may be encoded to represent the requirement for a particular type of digital credential.

In some embodiments, the digital indicia or the unique URL for providing the passwordless credential verification query may establish a secure data transmission path with a wallet application (e.g., WebSocket over TCP connection, among other examples) of a client device.

In some embodiments, the digital indicia or unique URL may be encoded with a request for a combination of discrete attributes which will satisfy the credential verification query for providing access to resources at the service provider system 140. As an example, a determined and requested combination of discrete attributes may represent a user's full legal name, a portion of the user's address (e.g., last 3 characters of a postal code or ZIP code), and/or a birth date of the user.

At operation 406, the service provider system 140 may transmit a signal representing a passwordless credential verification request to the client system 160. The passwordless credential verification request may be encoded as a digital indicia, and may be displayed on a display device of the client system 160. For example, a QR code encoded with a passwordless credential verification request may be displayed at a laptop computer for a client device user to review.

Figure 5B:
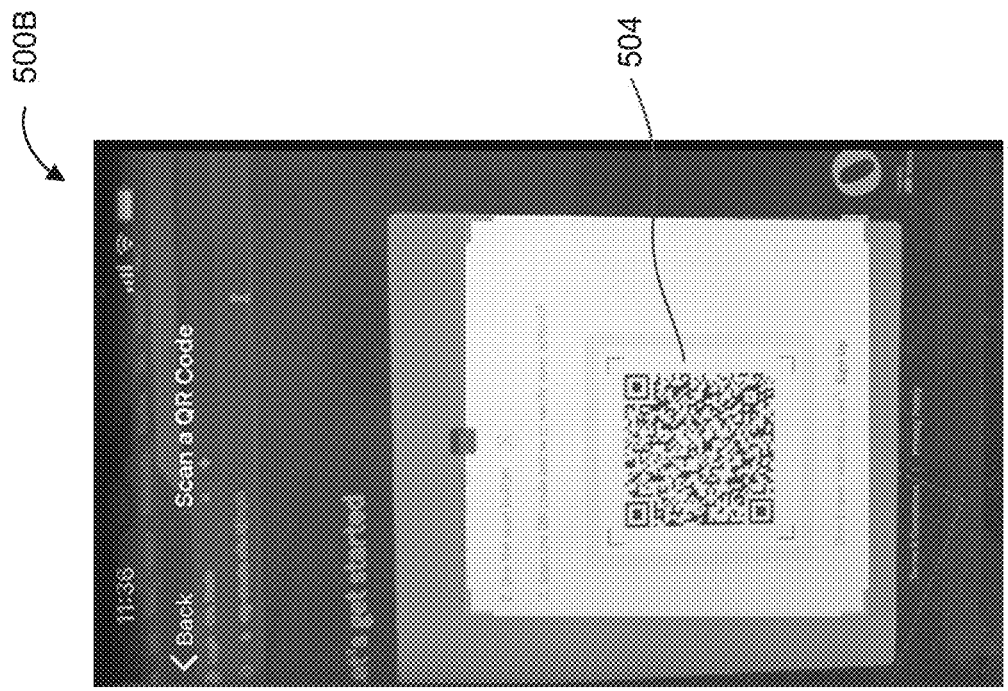
FIG. 5B illustrates a user interface showing an image capture operation based on augmented reality, in accordance with embodiments of the present disclosure.
Figure 5A:
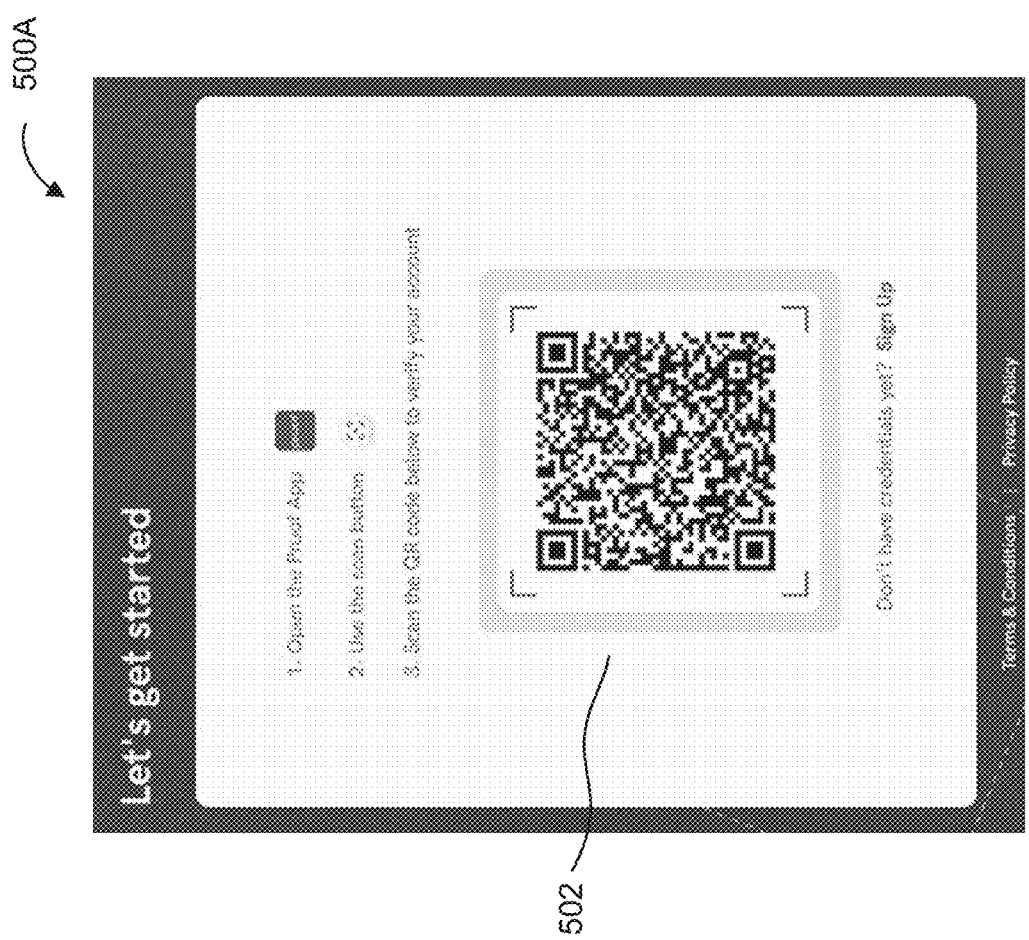
FIG. 5A illustrates a user interface showing a passwordless credential verification request encoded as a digital indicia, in accordance with embodiments of the present disclosure.

To illustrate, FIG. 5A illustrates a user interface 500A showing a passwordless credential verification request encoded as a digital indicia (e.g., 2-dimensional QR code), in accordance with embodiments of the present disclosure. The user interface 500A showing the digital indicia 502 may be a representation of the service provider system 140 requesting discrete attributes for verifying credentials of the respective client user. The digital indicia may be displayed at a primary client device of the client system 160.

FIG. 5B illustrates a user interface 500B showing an image capture operation based on augmented reality, in accordance with embodiments of the present disclosure. The user interface 500B may be displayed at a secondary client device, such as a smartphone device, and may include an image capture device for generating image data 504 of the digital indicia displayed at the primary client device. The primary client device (displaying the first user interface 500A) may correspond to and be positioned in close physical proximity to the secondary client device (illustrating the second user interface 500B). The secondary client device may be configured to capture, via an image capture device and based on augmented reality operations, image data 504 associated with the digital indicia representing the credential verification challenge query.

Figure 6B:
FIG. 6B illustrates a wallet user interface having a request interface, in accordance with embodiments of the present disclosure.
Figure 6A:
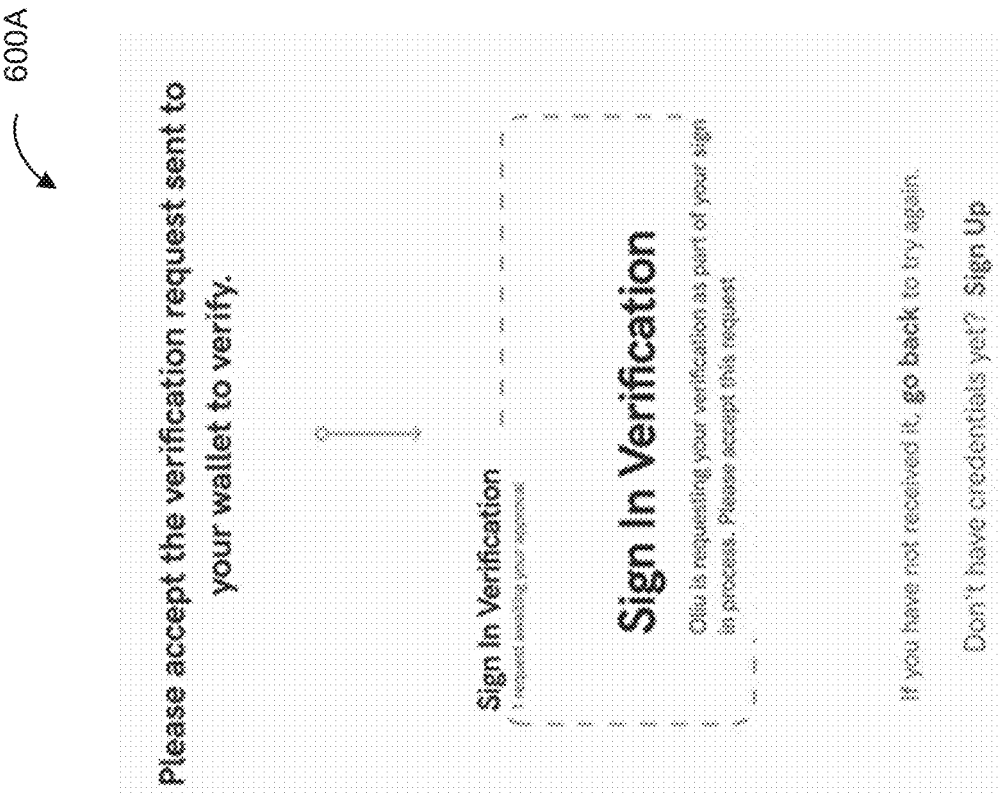
FIG. 6A illustrates a graphical user interface at a primary client device while awaiting receipt of digital credential data.

At operation 408, the primary client device may generate a user interface 600A for communicating that a credential verification challenge query has been transmitted to a wallet application for downstream operations. For example, FIG. 6A illustrates the graphical user interface 600A at the primary client device while awaiting receipt of digital credential data.

At operation 408, the secondary client device may generate a wallet user interface 600B having a request interface 604 for prompting the client device user to select at least one digital credential for responding to the credential verification challenge query. For example, FIG. 6B illustrates the wallet user interface 600B at the secondary client device while waiting for the client device user to identify the desired digital credentials for sharing to satisfy the credential verification challenge query.

The secondary client device may, in some embodiments, conduct operations for retrieving digital credential data sets from the credentials system 100 for generating a response to the credential verification challenge query.

For example, at operation 410, the secondary client device may transmit a request to the credentials system 100 to determine and compile a subset of digital credentials for replying to the credential verification challenge query. In the present example, the secondary client device may be configured as a thin-client type device, and wallet application contents may rely on the centralized or cloud-based credentials system 100 for managing digital credentials for respective client device users.

At operation 412, the credentials system 100 may generate the subset of digital credentials suitable for responding to the credential verification challenge query. In the above-described example, the credential verification challenge query may be encoded to request a user's full legal name, a portion of the user's address, and/or a birth date of the user.

In some scenarios, more than one digital credentials may include discrete attributes for satisfying the combination of discrete attributes for credential verification challenge query. For example, a digital credential representing a driver's license, a digital credential representing a government-issued health card, or a digital credential representing professional license (e.g., engineering, physician, law, etc.) card may respectively and independently include data suitable for addressing the credential verification challenge query. Thus, in some embodiments, the credentials system 100 may transmit more than one digital credential to the client system 160 as possible digital credentials for responding to the credential verification challenge query.

At operation 414, the credentials system 100 may transmit, to the client system 160, a signal representing the one or more digital credentials identified as suitable for responding to the credential verification query. For example, the secondary client device may receive a signal representing the one or more digital credentials identified for formulating a response to the credential verification query.

In some embodiments, the credentials system 100 may generate the subset of digital credentials suitable for responding to the credential verification challenge query. That is, the client system 160 may rely on the centralized or cloud-based credentials system 100 for managing digital credentials of the client system 160.

In some embodiments, operation 412 for generating the subset of digital credentials suitable for responding to the credential verification challenge query may alternatively be conducted at the secondary client device (e.g., smartphone device) of the client system 160. For example, operation 412 may be conducted at the client system 160 without requiring operation 410 or operation 414.

At operation 416, the client system 160 may receive the one or more identified digital credentials suitable for responding to the credential verification challenge query. The secondary client device may execute the wallet operation and may be configured to receive the signal representing the one or more identified digital credentials.

At operation 416, the client system 160 may further determine discrete attributes associated with the respective digital credentials for responding to the credential verification challenge query. In some scenarios, it may be desirable to reveal only the quantity of discrete attributes as required for responding to the credential verification challenge query.

In the example scenario where digital credentials representing each of a driver's license, a government-issued health card, or a professional license card may respectively and individually include attributes suitable for addressing the credential challenge verification query, the client system 160 may generate a user interface for listing discrete attributes from each of the driver's license, health card, and professional license card digital credential for presentation to the client device user.

Figure 7:
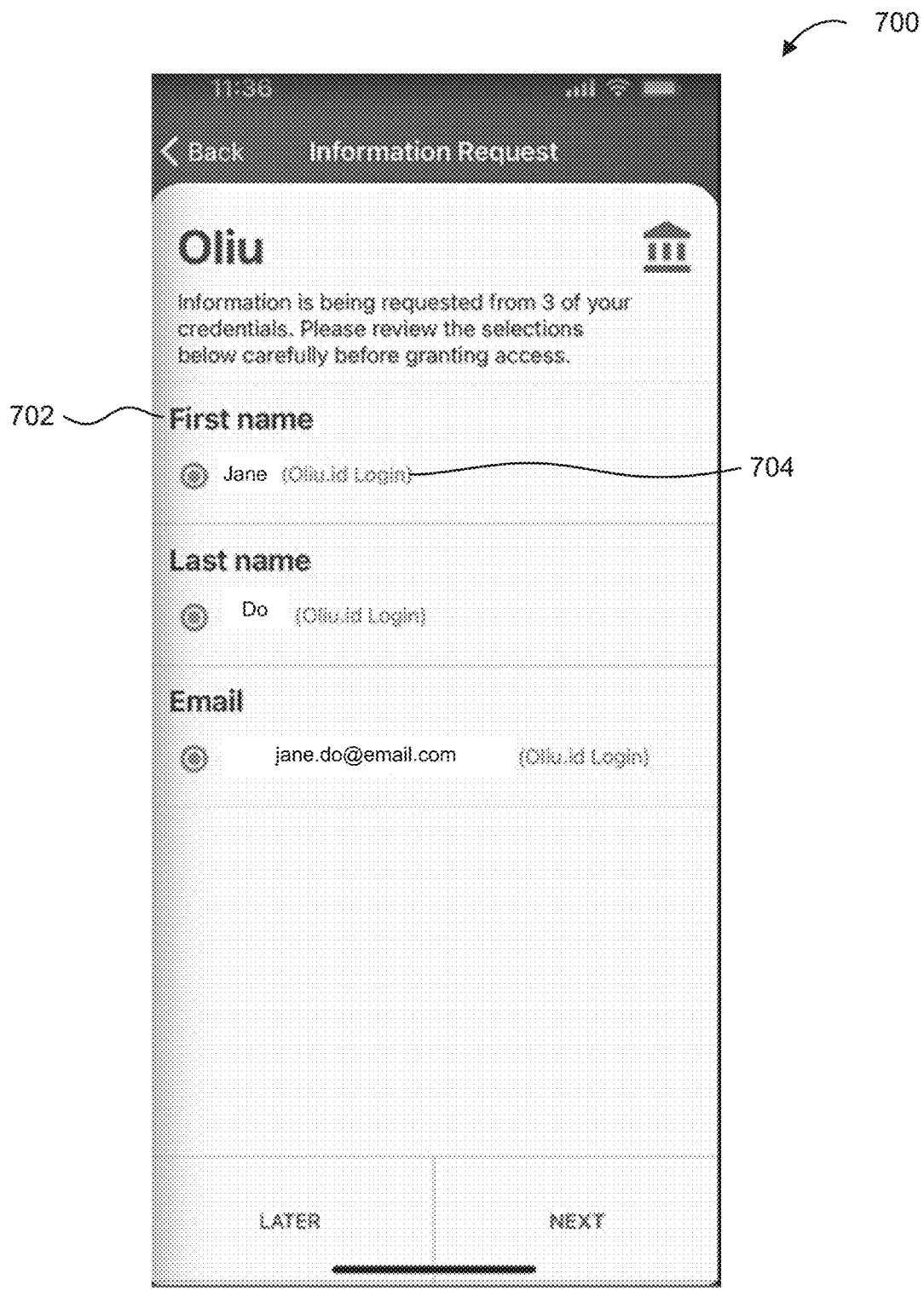
FIG. 7 illustrates an information request interface, in accordance with embodiments of the present disclosure.

As an example, FIG. 7 illustrates an information request interface 700, in accordance with an embodiment of the present application. The information request interface 700 may list the discrete attribute type 702 (e.g., first name, last name, etc.) and an association indicator 704 to identify the associated digital credential.

In the example illustrated in FIG. 7, displayed discrete attribute types 702 include a first name, last name, and an email address. Further, each of the discrete attribute types 702 is shown to be associated with the "Oliu.id Login" digital credential.

In FIG. 7, the information request interface 700 may only enumerate discrete attributes associated with a single digital credential. In such a scenario, only a single digital credential may be relevant for responding to a credential verification challenge query.

In scenarios where multiple digital credentials may represent discrete attributes suitable for responding to a credential challenge verification query (not illustrated in FIG. 7), multiple instances of a first name may be listed, and each specific first name may be shown to be associated with a unique digital credential (e.g., driver's license, heath card, professional license card, among other examples).

Figure 8:
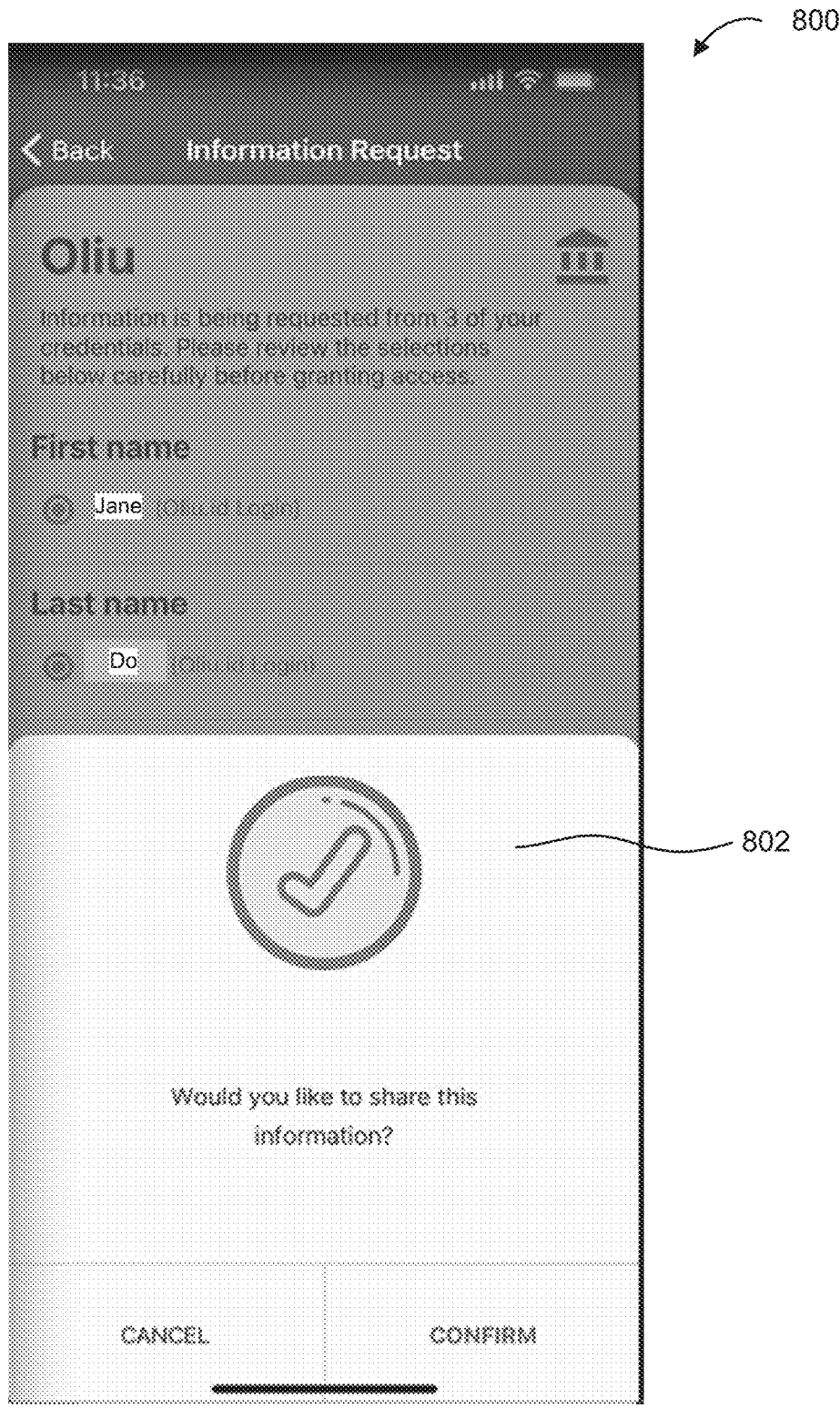
FIG. 8 illustrates a user interface including a confirmation prompt interface, in accordance with embodiments of the present disclosure.

At operation 416, the secondary client device may generate a user interface 800, illustrated at FIG. 8, including a confirmation prompt interface 802 for receiving user input on which discrete attributes may be shared with the service provider system 140.

Continuing with the above example, the user may prefer to transmit a discrete attribute representing a first name provided for by the digital credential representing the professional license card. In some scenarios, the user may prefer to limit dissemination of digital credentials issued by government entities (e.g., driver's license, heath card, among examples).

Accordingly, embodiments of the present disclosure provide systems and methods for client device users to selectively determine which digital credential among a plurality of suitable digital credentials, and to selectively determine which discrete attribute among a plurality of discrete attributes, is to be transmitted to a service provider system 140 for passwordless credential verification of that particular user. Features of embodiments disclosed herein allows client device users to reveal only as much personally identifiable information as required, and from digital credentials that they deem suitable, for responding to credential verification challenge queries.

In some embodiments, a service provider system 140 may require passwordless credential verification to be based on digital credentials issued by particular organizations deemed to be trustworthy or to be associated with a greater level of confidence. For instance, a service provider system 140 may require that passwordless credential verification of a user's full legal name be conducted based on a digital credential issued by a government organization, such as a Ministry of Transportation or a Ministry of Health.

Referring again to FIG. 4, the service provider platform 140 at operation 404 or the credentials system 100 at operation 412 may determine that a specific digital credential type (e.g., issued by government organization) is required for satisfactorily responding to a credential verification challenge query. Thus, at operation 416, the client system 160 may be configured to enumerate only government issued digital credentials having suitable discrete attributes at the information request interface 700.

Upon receiving user input, at operation 416, representing which discrete attributes may be shared with the service provider system, the client system 160 (e.g., secondary client device) at operation 418 may transmit the user selected discrete attributes associated with digital credentials to the service provider system 140 for passwordless credential verification.

Figure 9:
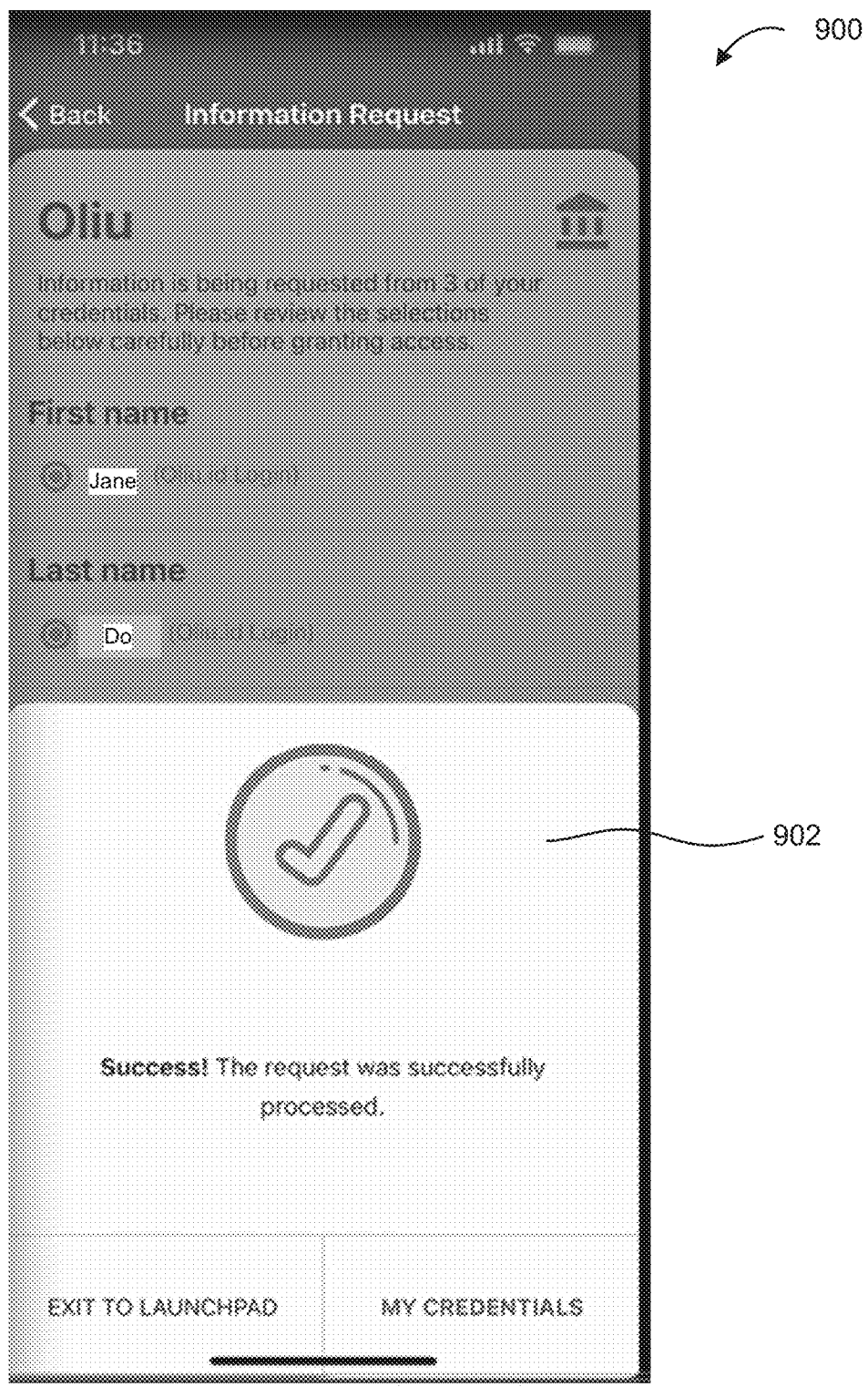
FIG. 9 illustrates a confirmation user interface, in accordance with embodiments of the present disclosure.

At operation 418, the client system 160 may generate a confirmation user interface 900, illustrated in FIG. 9, with a prompt validating that the request to transmit discrete attributes associated with suitable digital credentials for responding to a credential verification challenge query is successful.

At operation 418, the client system 160 may transmit the enumerated discrete attributes associated with one or more digital credentials to the service provider system 140 for responding to the credential verification challenge query.

In some embodiments, digital credentials may be based on data structures for storing discrete attributes. For example, digital credentials may be based on database tables for storing a plurality of discrete attributes for a user. In some other examples, digital credentials may be based on linked-list data structures for associating discrete attributes with a user.

In some embodiments, data structures representing features of digital credentials may be based on JSON or JSON-LD data-interchange format. In the present examples, data structures may be suitable for allowing interoperability among computing systems. Other data structures for representing digital credentials may be contemplated.

At operation 420, the service provider system 140 may receive the enumerated discrete attributes associated with one or more digital credentials and determine whether the received discrete attributes are satisfactory for responding to the credential verification challenge query. For example, the service provider system 140 may determine that the received discrete attributes of selected digital credentials is sufficient to complete the passwordless credential verification. The service provider system 140 may thus grant access to the computing resource based on the received digital credential. In the above-described example of a medical clinic portal website, the service provider system 140 may grant, to the client system 160, access to the medical clinic portal website.

At operation 422, the service provider system 140 may transmit, to the client system 160, access rights to a computing resource. For example, upon successfully completing operations of passwordless credential verification including a satisfactory response to the credential verification challenge query, the service provider system 140 may provide the client system 160 access to the example medical clinic portal website.

Figure 10:
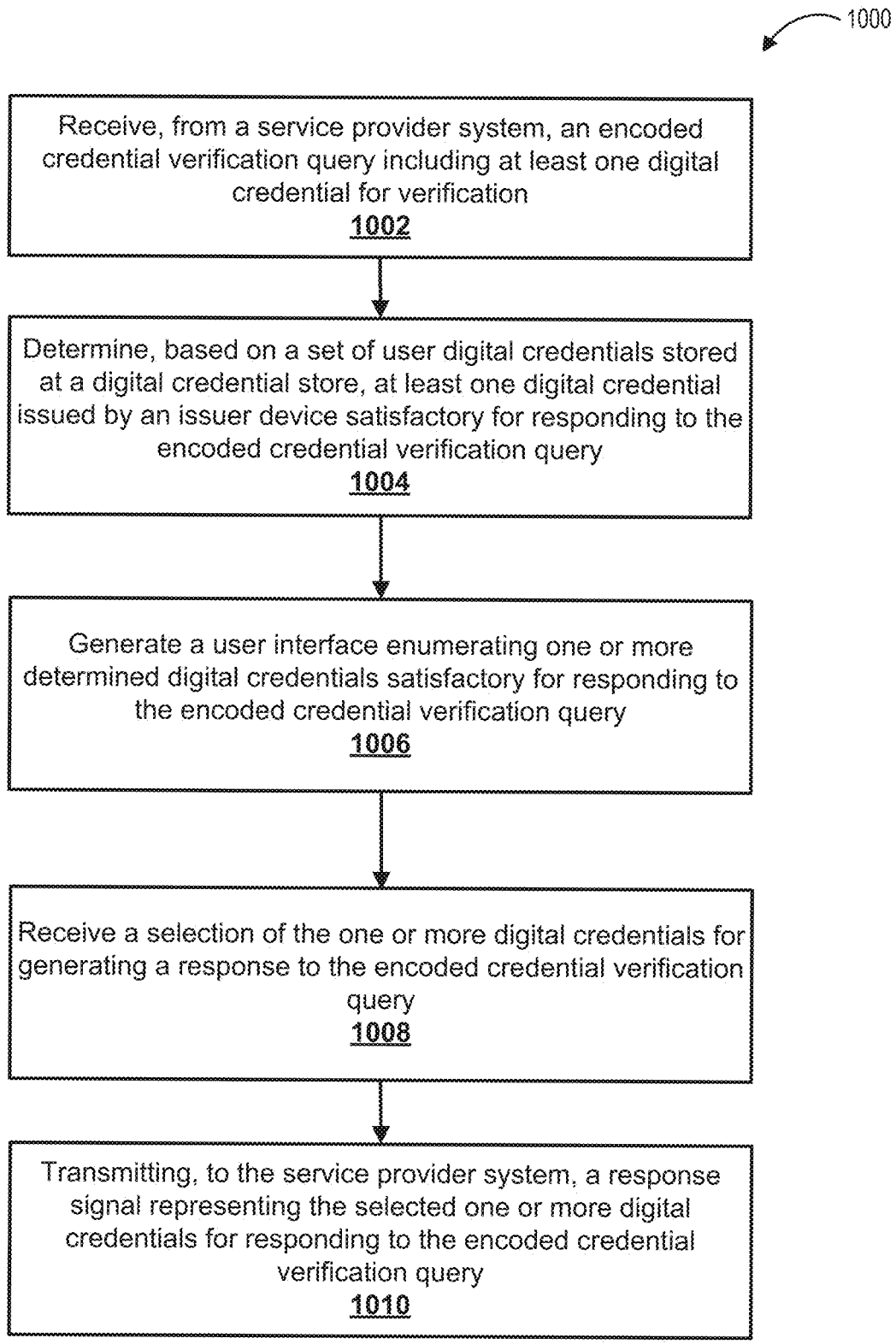
FIG. 10 illustrates a flowchart of a method for passwordless credential verification, in accordance with embodiments of the present disclosure.

Reference is made to FIG. 10, which illustrates a flowchart of a method for passwordless credential verification, in accordance with embodiments of the present disclosure. The method 1000 may be conducted by a processor of a client system 160 (FIG. 1). Processor-executable instructions may be stored in a memory and may be associated with a credentials application or a digital credential store not illustrated in FIG. 1. The method 1000 may include operations such as data retrievals, data manipulations, data storage, or other operations, and may include computer-executable operations.

In some embodiments, the client system 160 may include a primary client device, such as a desktop or laptop computer, and a secondary client device, such as a smartphone or tablet device. In some scenarios, the primary client device may be configured to transmit a request to access to networked computing resources at the service provider system 140 (FIG. 1). In some embodiments, the primary client device may display a graphical indicia, such as a QR code or other unique resource locator hyperlink, representing a challenge query, and the secondary client device may be configured to capture, based on augmented reality, image data associated with the indicia for decoding a digital credential verification query.

At operation 1002, the processor may receive, from a service provider system 140, an encoded credential verification query. As a non-limiting example, the service provider system 140 may be client portal of a banking institution. The client portal may provide a client user with online access to a client's banking account for conducting resource transfers (e.g., transactions), retrieving account reports, among other operations of the service provider system.

In some embodiments, the encoded credential verification query may identify at least one digital credential for verification. For example, the encoded credential verification query may be for verifying whether a user wallet application includes a particular banking institution credential (e.g., simply that the user is an existing client of a banking institution) to grant access to general information regarding service offerings.

In some other embodiments, the encoded credential verification query may identify at least one user attribute for verification prior to granting access to data that may be confidential or personally attributable. For example, the encoded credential verification query may be a credential verification challenge query for verifying particular user data, such as a user's family name, a portion of a user's address (e.g., last 3 characters of a postal or ZIP code), among other types of particular data. Operations for verifying particular user data may be a pre-condition for granting the client system 160 access to the client portal (e.g., networked computing resource) of the banking institution.

In some embodiments, the received encoded credential verification query may be in the form of a graphical indicia, such as a quick response (QR) code.

In some embodiments, the client system 160 may include a primary client device, such as a laptop or desktop computer, and the secondary client device may be a mobile device, such as a smartphone or tablet device.

In some embodiments, a primary client device of the client system 160 may receive and display the encoded credential verification query on a display in the form of a graphical indicia. The secondary client device may be configured to capture image data of the graphical indicia based on augmented reality operations conducted at the secondary client device. That is, the secondary device may receive the encoded credential verification query based on capturing an image of the quick response code displayed at the primary client device, and decode the encoded credential verification query to determine the at least one user attribute for verification.

To illustrate, a digital credential may be a digital representation of a user's full legal name, address, birth date, corrective lens requirement data, among other user attributes. The encoded credential verification query may be configured to request verification of a subset of the discrete attributes (e.g., data fields for full legal name, birth date, etc.) for defining the digital credential. Accordingly, embodiments of the present disclosure provide methods for verifying credentials of a client user based only on as much personally identifiable information as required for responding to a credential verification challenge.

In some embodiments, when the secondary client device may capture image data of the graphical indicia representing the encoded credential verification query, the processor may establish an encrypted communication channel with the digital credential store at the client system. For example, upon receiving, from a service provider system 140, an encoded credential verification query, the client system 160 may establish a secure connection with a digital credential wallet associated with the client system 160.

In some embodiments, a secure transmission connection may be established between the service provider system 140 and the client system 160, based on a peer-to-peer, end-to-end encrypted channel. For example, the secure transmission connection may bypass intermediary systems and be configured to provide a wallet application to wallet application, or client system 160 to wallet application communication channel. In the present example, the secure transmission connection may provide an authenticated channel between software applications of each of the computing devices based on private keys. In the present example, the secure transmission connection independently provides a mutual authentication mechanism between two computing devices.

In some embodiments, the secure transmission connection may be based on JSON Web encryption standards or may be based on the full JOSE standard. In the above examples, interoperability among computing devices may be provided.

At operation 1004, the processor may determine, based on a set of user digital credentials stored at a digital credential store, at least one digital credential that may be satisfactory for responding to the encoded credential verification query. The at least one digital credential may be issued by an issuer device separate from the service provider system In some embodiments, a digital credential store may be a digital credential wallet of a user provided at the client system 160. In some embodiments, the digital credential wallet may include a plurality of digital credentials issued to the client device user. For example, the digital credential wallet may include digital credentials representing paper-based credentials, such as a driver's license, a passport, a retail store loyalty card, a banking institution card, among other example credentials. In some scenarios, the respective digital credentials may include a set of user attributes. Respective digital credentials may include user attributes that may overlap or be similar to other digital credentials. For example, a driver's license and a passport may both respectively include a user's full legal name and birth date.

In some embodiments, the digital credentials may be issued by different organizations. For example, a driver's license may be issued by a regional/state/provincial government organization, a passport may be issued by a federal-level government organization, and a banking institution card may be issued by a banking organization, among other examples.

In some embodiments, one or more of the digital credentials stored at the digital credential store may be satisfactory for responding to the encoded credential verification query. For example, the processor may determine digital credentials satisfactory for responding to encoded credential verification queries by determining whether the digital credential may be issued by an issuer device associated with an accreditation credential. Accreditation credential may be based on a type of organization (e.g., government, etc.), may be based on a rated level of trust associated with the organization (e.g., digital certificate issued by the banking institution themselves), among other examples.

As an example, the service provider may require that digital credentials satisfactory for verifying a client user's name may need to be issued by a government organization. In the above-described scenario, the processor may determine that digital credentials representing the passport and the driver's license may be satisfactory for responding to the encoded credential verification query at least because these digital credentials are issued by a government organization, whereas digital credentials issued by retail store organizations may not be deemed reliable for verifying a client user's name.

In some embodiments, the determined digital credentials satisfactory for responding to the encoded credential verification query may include two or more digital credentials. Thus, as will be disclosed, a user interface may enumerate an ordered listing of the digital credentials based on a hierarchy of preferred credentials for responding to the encoded credential verification query. For example, the service provider system may be configured with a preference to verify a client user's name based on a digital credential issued by a federal government organization over a state/provincial/regional government organization.

In some embodiments, determining that one more digital credential is satisfactory for responding to an encoded credential verification query may include determining that the one or more numerated discrete attributes and the identified user attributes are corresponding data types. For example, to access the online portal of the client's banking account, the processor may determine that a driver's license may provide verification of a user's address (e.g., last 3 characters of a postal or ZIP code), where as a passport, a retail store loyalty card, or a banking institution card may not be suitable for verifying a user's address. The passport, retail store loyalty card, or banking institution card digital credentials may not be capable of providing a user's address.

At operation 1006, the processor may generate, for display, a user interface enumerating one or more determined digital credentials satisfactory for responding to the encoded credential verification query. The one or more enumerated digital credentials may be a subset of the set of user digital credentials stored at the digital credential store. For example, the user interface may enumerate a listing of a determined digital credential representing a banking client card. In the present example, the user having the digital credential representing a banking client card may be suitable for responding to the encoded credential verification query.

In some other embodiments, at operation 1006, the processor may generate, for display, a user interface enumerating one or more discrete attributes of the determined digital credential satisfactory for responding to the encoded credential verification query. The one or more enumerated discrete attributes may be a subset of the discrete attributes defining the determined digital credential.

As an example, the processor may generate a graphical user interface similar to the user interface illustrated in FIG. 7 for enumerating one or more discrete attributes satisfactory for responding to the encoded credential verification query. Continuing with the above-described example of accessing a client portal of a banking institution, the processor may generate a user interface enumerating a list of discrete attributes, such as a full legal name provided by a driver's license credential, a full legal name provided by a passport, and a full legal name provided by a banking institution.

In addition, the processor may generate a user interface enumerating a list of discrete attributes including a portion of a user's address (e.g., last 3 characters of a ZIP code) from a driver's license and a retail store loyalty card. In the present example, the processor may generate the user interface enumerating the one or more attributes in scenarios where responding to the encoded credential verification query may be required to be based on specific attributes of a user.

At operation 1008, the processor may receive, at the user interface, a selection of the one or more digital credentials for generating a response to the encoded credential verification query. As an example, the selection may include the digital credential representing a banking client card.

In some embodiments where the encoded credential verification query may identify at least one user attribute for verification, at operation 1008, the processor may receive, at the user interface, a selection of the one or more discrete attributes for generating a response to the encoded credential verification query. The one or more enumerated attributes may be a subset of a set of attributes defining the determined digital credential.

In some embodiments, a client device user may provide a selection of only as much personally identifiable information as required, or provide a selection of user data from preferred digital credentials, so as to provide the client device user with an ability to control propagation of digital credential data that may be considered personally identifiable information and confidential.

For example, a client device user may provide a selection to verify the user's address based on a digital credential representing a banking institution card and without use of a digital credential representing a driver's license, thereby allowing the client device user to share the digital credential representing the driver's license only in scenarios where no other digital credential may be suitable.

In some embodiments, the received selection of the one or more digital credentials for generating the response may be a user-attested or issuer entity verified attribute, where a user is provided with the option to select whether to share the user-attested digital credential or an issuer verified digital credential.

At operation 1010, the processor may transmit, to the service provider system 140, a response signal representing the selected one or more digital credentials for responding to the encoded credential verification query.

In some embodiments where the encoded credential verification query may identify at least one user attribute for verification, at operation 1010, the processor may transmit, to the service provider system 140, a response signal representing the selected one or more discrete attributes corresponding to the at least one user attribute of the encoded credential verification query.

In a scenario where the service provider system 140 successfully receives the response signal and verifies the credentials of the client device user, the processor may provide access to the networked computing resource to the client system 160. That is, the client system 160 may be provide access to the online portal of the client's banking account.

Embodiments of the present disclosure include systems and methods for selectively enumerating discrete attributes of those digital credentials that would be satisfactory for responding to credential verification queries, thereby allowing client device users to selectively allow transmission of personally identifiable information, among other types of information, to a service provider system 140.

In some embodiments of the present disclosure, systems and methods may include operations to provide passwordless credential verification based on digital credentials issued by issuer devices 130 separate from the service provider system 140. Accordingly a client device user may be granted access to networked computing resources, or other types of resources, based on digital credentials issued by unaffiliated or separate entities. In such scenarios, a client device user may be granted to access networked computing resources at a service provider system 140 without needing to have established a prior-registered profile at the service provider system 140.

In some other embodiments, the digital credentials may be issued by the service provider system 140 as the issuer device itself. That is, the digital credentials may be prior verified/attested to by the service provider system 140, and the processor may receive a selection of one or more digital credentials via a user interface based on at least one digital credential prior verified by the service provider system 140.

In some scenarios described in the present disclosure, the service provider system 140 may not require that digital credentials for verification be associated with an accreditation credential provided by a trusted or known organization or entity. That is, the service provider system may not be interested in or require that the digital credential be verified or accredited by a trusted or known organization.

Accordingly, in some embodiments, the encoded credential verification query includes at least one data field communicating that a user-attested digital credential may be suitable for responding to the encoded credential verification query. Thus, the at least one digital credential satisfactory for responding to the encoded credential verification query may be a user-attested credential.

In some embodiments, digital credentials may include a data field having a value indicating whether that digital credential may be a user-attested digital credential or a digital credential associated with an attestation credential from a trusted or known organization. For example, the data field having a null or zero value can indicate that the given digital credential is a user-attested credential, whereas the data field having a non-null value can indicate that the given digital credential has been issued by a trusted or known entity.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present disclosure is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

What is claimed is:

1. A client system for passwordless credential verification comprising:
    a processor;
    a memory coupled to the processor and storing processor-executable instructions that, when executed, configure the processor to:
        receive, from a service provider system, an encoded credential verification query, the encoded credential verification query identifying at least one digital credential for verification;
        determine, based on a set of user digital credentials stored at a digital credential store, at least one digital credential issued by an issuer device separate from the service provider system satisfactory for responding to the encoded credential verification query;
        generate, for display, a user interface enumerating one or more determined digital credentials satisfactory for responding to the encoded credential verification query, the one or more enumerated digital credentials being a subset of the set of user digital credentials stored at the digital credential store;
        receive, via the user interface, a selection of the one or more digital credentials for generating a response to the encoded credential verification query; and
        transmit, to the service provider system, a response signal representing the selected one or more digital credentials for responding to the encoded credential verification query.

2. The client system of claim 1, wherein determining that the at least one digital credential is satisfactory for responding to the encoded credential verification query includes determining that the digital credential is issued by an issuer device associated with an accreditation credential.

3. The client system of claim 1, wherein respective digital credentials include at least one attribute, and wherein the encoded credential verification query identifies at least one user attribute for verification, and wherein generating the user interface includes generating the user interface for enumerating one or more attributes of the determined digital credential satisfactory for responding to the encoded credential verification query, the one or more enumerated attributes being a subset of a set of attributes associated with the determined digital credential.

4. The client system of claim 3, wherein determining that the at least one digital credential is satisfactory for responding to the encoded credential verification query includes determining that the one or more enumerated attributes and the at least one identified user attribute for verification are corresponding data types.

5. The client system of claim 1, wherein the at least one determined digital credential satisfactory for responding to the encoded credential verification query includes two or more digital credentials;

and wherein the user interface includes an ordered listing of the attributes associated with a respective digital credential based on an accreditation level of a plurality of the two or more determined digital credentials.

6. The client system of claim 1, wherein the received encoded credential verification query includes a graphical indicia.

7. The client system of claim 6, comprising a primary client device and a secondary client device including an image capture device, wherein the secondary client device is configured to:

receive the encoded credential verification query based on capturing an image of the graphical indicia displayed at the primary client device; and decode the encoded credential verification query to determine at least one user attribute for verification.

8. The client system of claim 1, wherein the encoded credential verification query includes a data field communicating that a user-attested digital credential is suitable for responding to the encoded credential verification query, and wherein the at least one digital credential satisfactory for responding to the encoded credential verification query is a user-attested digital credential.

9. The client system of claim 1, wherein receiving, from the service provider system, the encoded credential verification query establishes an encrypted communication channel with the digital credential store at the client system.

10. The client system of claim 1, wherein the memory include instructions that, when executed, configure the processor to transmit a request to access a resource associated with the service provider system.

11. The client system of claim 1, wherein the issuer device includes at least one of a government entity user, a corporate entity user, or an individual entity user.

12. A method for passwordless credential verification comprising:

receiving, from a service provider system, an encoded credential verification query, the encoded credential verification query identifying at least one digital credential for verification;

determining, based on a set of user digital credentials stored at a digital credential store, at least one digital credential issued by an issuer device separate from the service provider system satisfactory for responding to the encoded credential verification query;

generating, for display, a user interface enumerating one or more determined digital credentials satisfactory for responding to the encoded credential verification query, the one or more enumerated digital credentials being a subset of the set of user digital credentials stored at the digital credential store;

receiving, via the user interface, a selection of the one or more digital credentials for generating a response to the encoded credential verification query; and transmitting, to the service provider system, a response signal representing the selected one or more digital credentials for responding to the encoded credential verification query.

13. The method of claim 12, wherein determining that the at least one digital credential is satisfactory for responding to the encoded credential verification query includes determining that the digital credential is issued by an issuer device associated with an accreditation credential.

14. The method of claim 12, wherein respective digital credentials include at least one attribute, and wherein the encoded credential verification query identifies at least one user attribute for verification, and wherein generating the user interface includes generating the user interface for enumerating one or more attributes of the determined digital credential satisfactory for responding to the encoded credential verification query, the one or more enumerated attributes being a subset of a set of attributes associated with the determined digital credential.

15. The method of claim 14, wherein determining that the at least one digital credential is satisfactory for responding to the encoded credential verification query includes determining that the one or more enumerated attributes and the at least one identified user attribute for verification are corresponding data types.

16. The method of claim 12, wherein the at least one determined digital credential satisfactory for responding to the encoded credential verification query includes two or more digital credentials;

and wherein the user interface includes an ordered listing of the attributes associated with a respective digital credential based on an accreditation level of a plurality of the two or more determined digital credentials.

17. The method of claim 12, wherein the received encoded credential verification query includes a graphical indicia, and wherein the method comprising:

receiving the encoded credential verification query based on capturing an image of the graphical indicia displayed at the primary client device; and decoding the encoded credential verification query to determine at least one user attribute for verification.

18. The method of claim 12, wherein the encoded credential verification query includes a data field communicating that a user-attested digital credential is suitable for responding to the encoded credential verification query, and wherein the at least one digital credential satisfactory for responding to the encoded credential verification query is a user-attested digital credential.

19. The method of claim 12, comprising: to transmitting a request to access a resource associated with the service provider system.

20. A non-transitory computer-readable medium having stored thereon machine interpretable instructions which, when executed by a processor, cause the processor to perform a computer implemented method for passwordless credential verification comprising:

receiving, from a service provider system, an encoded credential verification query, the encoded credential verification query identifying at least one digital credential for verification;

determining, based on a set of user digital credentials stored at a digital credential store, at least one digital credential issued by an issuer device separate from the service provider system satisfactory for responding to the encoded credential verification query;

generating, for display, a user interface enumerating one or more determined digital credentials satisfactory for responding to the encoded credential verification query, the one or more enumerated digital credentials being a subset of the set of user digital credentials stored at the digital credential store;

receiving, via the user interface, a selection of the one or more digital credentials for generating a response to the encoded credential verification query; and transmitting, to the service provider system, a response signal representing the selected one or more digital credentials for responding to the encoded credential verification query.

* * * * *